(12) United States Patent
Tagata et al.

(10) Patent No.: US 8,220,776 B2
(45) Date of Patent: Jul. 17, 2012

(54) NORMALLY OPENED SOLENOID VALVE

(75) Inventors: Kazuhiro Tagata, Nagano (JP); Tetsuo Sasaki, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 57 days.

(21) Appl. No.: 12/828,683

(22) Filed: Jul. 1, 2010

(65) Prior Publication Data

US 2011/0001072 A1   Jan. 6, 2011

(30) Foreign Application Priority Data

Jul. 3, 2009   (JP) .................................. 2009-159158

(51) Int. Cl.
F16K 31/02   (2006.01)
(52) U.S. Cl. .............................. 251/129.02; 251/129.15
(58) Field of Classification Search ............. 251/129.02, 251/129.15
See application file for complete search history.

(56) References Cited

U.S. PATENT DOCUMENTS

| | | | | |
|---|---|---|---|---|
| 5,010,923 A * | 4/1991 | Kouda et al. | ............. | 137/625.34 |
| 6,945,508 B2 * | 9/2005 | Lewis et al. | ............. | 251/129.02 |
| 7,467,780 B2 * | 12/2008 | Kratzer | .................... | 251/129.02 |
| 7,575,218 B2 * | 8/2009 | Speer et al. | ............. | 251/129.02 |
| 7,681,862 B2 * | 3/2010 | Kratzer | .................... | 251/129.02 |
| 7,871,056 B2 * | 1/2011 | Kratzer | .................... | 251/129.02 |
| 7,938,381 B2 * | 5/2011 | Takahashi et al. | ........ | 251/129.02 |

FOREIGN PATENT DOCUMENTS

| | | |
|---|---|---|
| JP | 7055042 | 3/1995 |
| JP | 2002-347597 | 12/2002 |
| JP | 2004169921 | 6/2004 |
| JP | 2004255615 | 9/2004 |
| JP | 2004360748 | 12/2004 |
| JP | 2005114062 | 4/2005 |
| JP | 2005282747 | 10/2005 |
| JP | 2007285334 | 11/2007 |

OTHER PUBLICATIONS

Japanese Office Action for corresponding Japanese Appl. No. 2009-159158, Drafting date Feb. 1, 2011, Dispatch date Feb. 8, 2011, (English translation).

* cited by examiner

*Primary Examiner* — John Fristoe, Jr.
*Assistant Examiner* — Ian Paquette
(74) *Attorney, Agent, or Firm* — Andrew M. Calderon; Roberts Mlotkowski Safran & Cole, P.C.

(57) ABSTRACT

A normally opened solenoid valve includes: a coil; a fixed core; a movable core; a valve seat located at one of openings of a through hole formed in the fixed core; and a valve body inserted into the through hole. The valve body includes: a shaft part inserted into the through hole and pressed by the movable core; a valve part seated on or separated from the valve seat; and a connection part configured to connect the shaft part with the valve part. The connection part includes a conical portion increased in diameter toward the shaft part from the valve part. A plurality of reduced thickness portions, each having a concave shape as viewed in an axial direction, are formed in the conical portion. The reduced thickness portions are located at equal intervals in a circumferential direction of the conical portion.

19 Claims, 6 Drawing Sheets

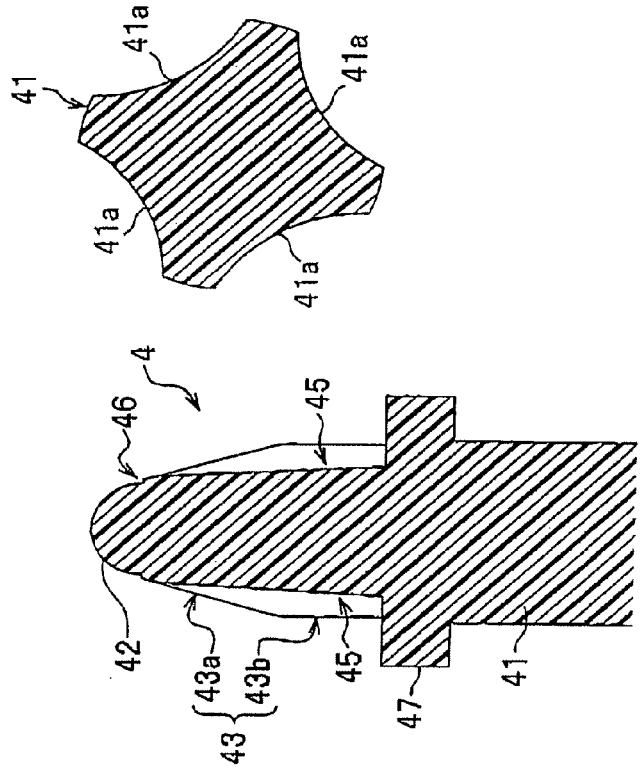
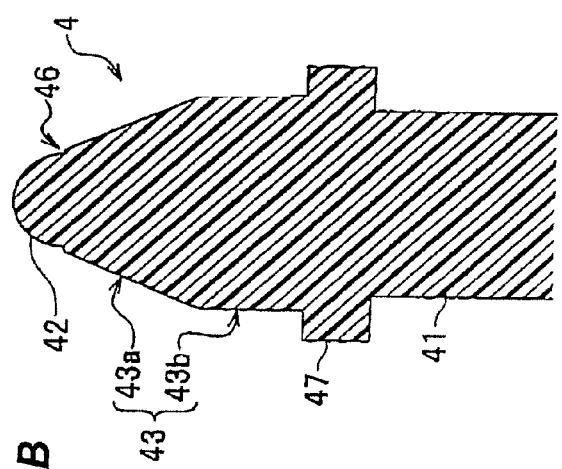
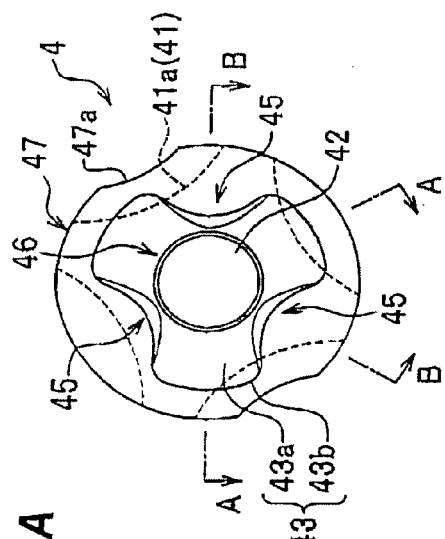

NORMALLY OPENED SOLENOID VALVE

BACKGROUND

1. Field of the Invention

The present invention relates to normally opened solenoid valves.

2. Description of the Related Art

Conventionally known techniques concerning normally opened solenoid valves include one described in JP-A-2002-347597.

In a normally opened solenoid valve described in JP-A-2002-347597, its valve body includes: a shaft part; and a tip part provided at an extremity of the shaft part and serving as a valve closing body, and the shaft part and the tip part are formed in one piece by injection molding using a resin material.

The tip part has: a conical portion provided adjacent to the shaft part; a columnar portion provided continuously with the conical portion; and a valve part that is provided at an extremity of the columnar portion, and is provided, at its end portion, with an abutting surface abutted against a valve seat.

The shaft part is inserted into a through hole formed in a fixed core, and the above-described valve body is slid by driving of a movable core.

In the above-described normally opened solenoid valve, the valve body is formed in one piece using a resin material, thus obtaining advantages that a reduction in weight of the valve body is enabled and a responsiveness of an opening/closing operation is improved.

Actually, in JP-A-2002-347597 described above, the conical portion provided in the tip part of the valve body is formed into a simple conical shape. Therefore, the volume of the valve body is increased in the tip part of the valve body, which might cause a so-called "sink mark (shrink mark)" in the valve part at the time of molding, and might cause a reduction in shape accuracy of the valve part.

As measures to be taken to suppress occurrence of such a sink mark, the tip part of the valve body may be conceivably reduced in volume. However, a simple reduction in the volume of the tip part of the valve body might lead to a reduction in strength of the tip part.

SUMMARY

Therefore, the present invention has been made to solve the foregoing problems, and its object is to provide a normally opened solenoid valve capable of improving shape accuracy of a valve part while ensuring its strength.

According to an aspect of the invention, there is provided a normally opened solenoid valve including: a coil adapted to be energized; a fixed core adapted to be excited by energization of the coil; a movable core configured to be moved by being drawn to the fixed core; a valve seat located at one of openings of a through hole formed in the fixed core; and a valve body inserted into the through hole and driven by a movement of the movable core, wherein: the valve body includes: a shaft part inserted into the through hole and pressed by the movable core; a valve part seated on or separated from the valve seat; and a connection part configured to connect the shaft part with the valve part; the shaft part, the valve part and the connection part are formed in one piece using a resin; the connection part includes a conical portion increased in diameter toward the shaft part from the valve part; a plurality of reduced thickness portions, each having a concave shape as viewed in an axial direction, are formed in the conical portion; and the reduced thickness portions are located at equal intervals in a circumferential direction of the conical portion.

In this normally opened solenoid valve, the connection part includes the conical portion increased in diameter toward the shaft part from the valve part, and a plurality of the axially concave reduced thickness portions, located at equal intervals in the circumferential direction, are formed in the conical portion, thus enabling a volume reduction by the reduced thickness portions while ensuring strength of the conical portion.

Therefore, occurrence of sink marks at the time of resin molding can be suitably suppressed, and shape accuracy of the valve part can be improved.

Further, since a plurality of the reduced thickness portions are located at equal intervals in the circumferential direction of the conical portion, the thickness of the conical portion will not be unbalanced in the circumferential direction thereof. Furthermore, since the reduced thickness portions each have a concave shape as viewed in its axial direction, an amount of change in the axial cross-sectional area of the conical portion can be accordingly more gradual as compared with a case where no reduced thickness portions described above are provided.

Thus, the occurrence of sink marks at the time of resin molding can be suitably suppressed, and the shape accuracy of the valve part can be improved.

Furthermore, since the conical portion is formed from the valve part toward the shaft part, the valve part will be substantially located at the top of the conical portion, and an abutting force acting on the valve part will be directly transmitted to the conical portion from the valve part at the time of valve closing. Thus, the strength of the valve part can be suitably ensured, and the shape accuracy of the valve part is improved as mentioned above. And in conjunction with these effects, the possibility of occurrence of deformation or the like in the valve part (or the valve body) can be reduced. Therefore, opening/closing of the valve body, stabilized over a long period of time, can be realized, and the normally opened solenoid valve with high operational reliability is obtained.

The shaft part may be formed with a hole, the hole being extended from an end portion of the shaft part, located opposite to the valve part, toward the valve part.

In this normally opened solenoid valve, since the hole is formed in the shaft part, the shaft part can be reduced in weight, and the valve body can be eventually reduced in weight.

Note that at the time of molding of the valve body, the hole can be formed by inserting a member such as a pin into the shaft part. In this case, the member such as a pin can be utilized as a member for resin compression at the time of molding of the valve body.

When the member such as a pin is utilized as the member for resin compression, the member such as a pin can be axially inserted into the shaft part toward the valve part from an end portion of the shaft part, located opposite to the valve part, and the resin can be compressed toward the valve part by the member such as a pin. Thus, the shape accuracy of the valve part can be further improved.

The connection part may include a base portion provided continuously with a region of the conical portion, located closer to the shaft part, and the reduced thickness portions may be formed from the conical portion to the base portion.

In this normally opened solenoid valve, since the reduced thickness portions are formed across the conical portion and the base portion provided continuously with the conical portion, a volume of the valve body in the connection part can be further reduced, and the occurrence of sink marks at the time of resin molding can be further suppressed. Thus, the shape accuracy of the valve part can be further improved.

According to the present invention, a normally opened solenoid valve capable of improving shape accuracy of a valve part while ensuring strength thereof is obtained.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 3A is a diagram illustrating the valve body, as viewed from a valve part;

FIG. 3B is a cross-sectional view taken along the line A-A of FIG. 3A;

FIG. 3C is a cross-sectional view taken along the line B-B of FIG. 3A;

FIG. 3D is a lateral cross-sectional view illustrating a shaft part of the valve body;

DETAILED DESCRIPTION OF THE INVENTION

Hereinafter, an embodiment of the present invention will be described in detail with reference to the drawings as appropriate.

It should be noted that in the following description, a basic structure of a normally opened solenoid valve will be described first, and then structures of features of the present invention will be described in detail.

Figure 1:
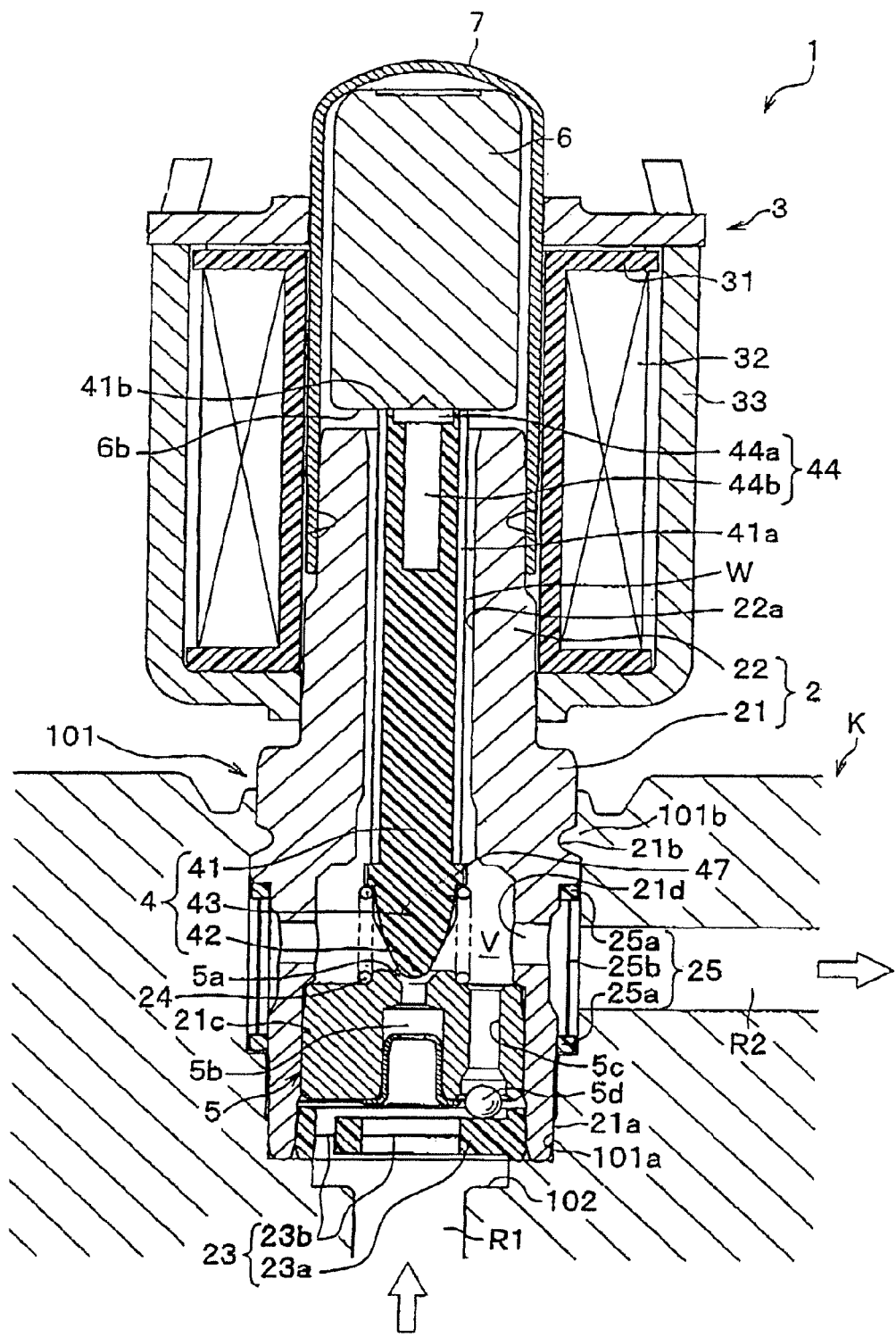
FIG. 1 is a longitudinal cross-sectional view illustrating a normally opened solenoid valve according to an embodiment of the present invention.

As illustrated in FIG. 1, a normally opened solenoid valve 1 is a valve for switching opening/closing of passages R1 and R2 contained in a base body K constituting an anti-lock braking control device or the like, and is structured to mainly include: a fixed core 2; a coil unit 3; a valve body 4; a valve seat constituting member 5; and a movable core 6.

The base body K has a bottomed attachment hole 101 into which the normally opened solenoid valve 1 is inserted, and the passages R1 and R2 are communicated with the attachment hole 101. In accordance with an outer shape of the fixed core 2 of the normally opened solenoid valve 1, the attachment hole 101 is formed into a stepped cylindrical shape sequentially increased in diameter toward an opening from a bottom portion 102 of the attachment hole 101.

In the normally opened solenoid valve 1, at normal times, an after-mentioned valve part 42 provided at a lower tip of the valve body 4 is separated from a valve seat 5a of the valve seat constituting member 5 and located at an upper position (for the sake of convenience, the terms "upper" and "lower" are used with reference to FIG. 1), thus allowing a hydraulic fluid to flow from the downwardly-connected passage R1 to the laterally-connected passage R2.

Further, when the valve part 42 is seated on the valve seat 5a by energization to the coil unit 3, the passage R1 is closed to shut off a flow of the hydraulic fluid therethrough. Furthermore, in this state, upon shut-off of energization to the coil unit 3, the valve part 42 is separated from the valve seat 5a by an after-mentioned return spring 24 to open the passage R1, thereby allowing the flow of the hydraulic fluid therethrough.

Next, the respective elements will be described in detail.

The fixed core 2 is formed into a cylindrical shape having a hole vertically passing therethrough, and also serves as a housing for housing each component. The fixed core 2 is made of a magnetic material such as iron or iron alloy, and includes: a body part 21 attached to the base body K; and a core part 22 which is formed to have an outer diameter smaller than that of the body part 21 so as to be extended upward, and around which the coil unit 3 is located.

A lower end portion of the body part 21 is pressed into a lower end of the attachment hole 101, and an outer peripheral face 21a of the lower end portion is brought into intimate contact with a lower end inner peripheral face 101a of the attachment hole 101. Thus, leakage of the hydraulic fluid is prevented. Further, an upper outer peripheral face of the body part 21 is provided with a concaved engagement groove 21b, and a plastic deformation portion 101b, provided at the attachment hole 101, goes into the engagement groove 21b, thus engaging the body part 21 with the attachment hole 101. Furthermore, an inner space of the body part 21 is formed so that a lower region thereof is expanded by a stepped inner face sequentially increased in diameter downward.

A first dust collection filter 23 is inserted into a region of the inner space, located at the lower end portion of the body part 21, and the valve seat constituting member 5 is inserted into a region of the inner space, located above the dust collection filter 23. Moreover, the after-mentioned valve part 42 of the valve body 4 is located above the valve seat constituting member 5 in the inner space of the body part 21, and the return spring 24 for urging the valve body 4 toward a pre-movement position is interposed between the valve seat constituting member 5 and the valve body 4.

Besides, a second dust collection filter 25 is annularly attached to the outer peripheral face of the body part 21.

The first dust collection filter 23 is formed to include: a cylindrical frame body 23a fitted into the region of the inner space, located at the lower end portion of the body part 21; and a mesh body 23b held by the frame body 23a.

The valve seat constituting member 5 is a cylindrical member fitted into a valve chest constituting portion 21c of the body part 21, and an outer peripheral face of the valve seat constituting member 5 is brought into intimate contact with an inner peripheral face of the valve chest constituting portion 21c. At a center of an upper face of the valve seat constituting member 5, the valve seat 5a, on which the valve part 42 of the valve body 4 is seated, is protrusively provided so as to surround a hollow portion 5b.

Further, a through hole 5c is formed in parallel to the hollow portion 5b at a lateral portion of the valve seat constituting member 5, and a spherical body 5d serving as a unidirectional valve is located at a lower end portion of the through hole 5c. The spherical body 5d closes the through hole 5c when a hydraulic pressure on the part of the dust collection filter 23 is higher than a hydraulic pressure on the part of a valve chest V; on the other hand, the spherical body 5d opens the through hole 5c when the hydraulic pressure on the part of the valve chest V is higher than the hydraulic pressure on the part of the dust collection filter 23. Dropping of the above-described spherical body 5d is prevented by the frame body 23a of the dust collection filter 23.

It should be noted that in the valve chest constituting portion 21c, a through hole 21d, through which the valve chest V and the passage R2 are communicated with each other, is formed.

The second dust collection filter 25 is annularly attached to the outer peripheral face of the body part 21 so as to surround the through hole 21d of the body part 21. The dust collection filter 25 is formed to include: a pair of upper and lower annular rings 25a, 25a ; and a mesh body 25b held by the annular rings 25a, 25a.

The return spring 24 consists of a coil spring, and the compressed return spring 24 is interposed between the valve seat 5a and the valve body 4. The valve body 4 is urged toward the movable core 6 by the return spring 24 so that the valve part 42 is separated from the valve seat 5a at normal times.

The core part 22 has a through hole 22a communicated with the inner space of the body part 21, and an after-mentioned shaft part 41 of the valve body 4 is slidably inserted into the through hole 22a. Furthermore, the movable core 6 is driven by excitation of the coil unit 3, thereby sliding the valve body 4 downward, and allowing the valve part 42 to be seated on the valve seat 5a. Details of the valve body 4 will be described later.

A bottomed cylindrical cover 7 is fixed to an upper outer peripheral face of the core part 22 in a fluid-tight manner. It should be noted that the cover 7 is fixed to the core part 22, for example, by welding the cover 7 around the perimeter thereof.

The movable core 6 consists of a magnetic material such as iron or iron base alloy, and moves upward/downward through the inside of the cover 7 with a lower end face 6b of the movable core 6 abutted against an upper end portion 41b of the shaft part 91 of the valve body 4. In other words, when the coil unit 3 is excited, the movable core 6 is pulled toward the fixed core 2 and is moved downward, thereby pressing the valve body 4 downward.

The coil unit 3 is formed by winding a coil 32 around a resin bobbin 31, and a yoke 33 constituting a magnetic path is located outwardly of the bobbin 31.

It should be noted that the coil unit 3 is annularly attached to the core part 22 of the fixed core 2 and to the cover 7.

Next, the valve body 4 will be described in detail with reference to FIGS. 1 to 3.

As illustrated in FIG. 1, the valve body 4 is formed to include: the shaft part 41 inserted into the through hole 22a provided in the core part 22 of the fixed core 2; the valve part 42 seated on or separated from the valve seat 5a of the valve seat constituting member 5; and a connection part 93 through which the shaft part 41 and the valve part 42 are connected to each other. In the present embodiment, the valve body 4 is molded in one piece using a resin material as described later. As the resin material, polyether ether ketone (PEEK) or the like, which is light in weight and will not be swollen or shrunk, for example, in a hydraulic fluid, is used.

Figure 2:
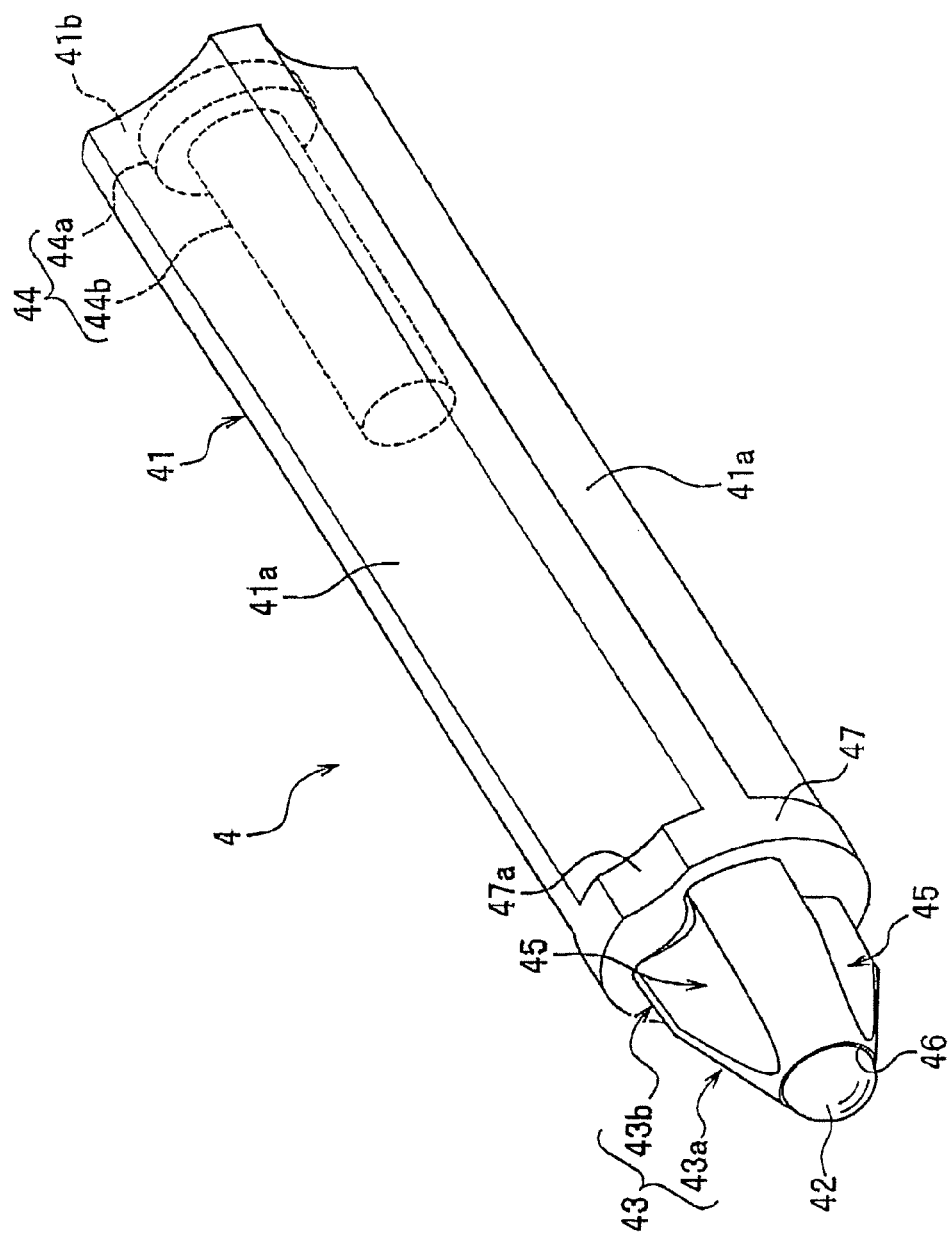
FIG. 2 is a perspective view illustrating a valve body of the normally opened solenoid valve according to the embodiment of the present invention.

As illustrated in FIG. 2, grooves 41a extended axially and curved and concaved in cross section are formed at a peripheral wall of the shaft part 41. As illustrated in FIGS. 3A and 3D, a total of the four grooves 41a are formed at intervals of 90 degrees in a circumferential direction of the shaft part 41.

As illustrated in FIG. 1, with the shaft part 41 inserted into the through hole 22a, a path W through which the hydraulic fluid passes is formed between the shaft part 41 and an inner peripheral face of the through hole 22a. Thus, the hydraulic fluid flowing from the valve chest V is allowed to pass through the path W toward the movable core 6.

As illustrated in FIG. 2, in the shaft part 41, a stepped columnar hole 44 is formed so as to be extended from the upper end portion 41b toward the valve part 42. The hole 44 includes a large diameter portion 44a and a small diameter portion 44b, and can be formed by insertion of a pin 70 (see FIG. 4B) functioning as a member for resin compression at the time of resin molding that will be described later. The use of the above-described pin 70 at the time of resin molding enables an improvement in shape accuracy of the valve body 4, and an improvement in shape accuracy of the valve part 42 in particular.

As illustrated in FIG. 1, with the coil unit 3 demagnetized, the above-described shaft part 41 is located at a position at which the upper end portion 41b is protruded from an upper end face of the fixed core 2 due to an urging force of the return spring 24, and the lower end face 6b of the movable core 6 is abutted against the protruded upper end portion 41b.

Further, at a lower portion of the shaft part 41, i.e., at a portion thereof connected to the connection part 43, a collar portion 47 having a diameter larger than that of the shaft part 41 is formed. At the collar portion 47, concave portions 47a (see FIGS. 2 and 3A) are formed in association with gates G1 and G2 provided at a fixed die 60 (see FIG. 4A) at the time of resin molding that will be described later. As illustrated in FIG. 1, the collar portion 47 functions as a seat for the return spring 24, and an upper end of the return spring 24 is abutted against the collar portion 47. Thus, an urging force is applied to the valve body 4 to urge the valve body 4 toward the movable core 6.

The valve part 42 has a hemispherical shape as illustrated in FIG. 2 and FIGS. 3A to 3C, and a hemispherical abutting face of the valve part 42 is seated on the valve seat 5a (see FIG. 1 [ditto for the following]) to shut off the communication between the passages R1 and R2, and is separated from the valve seat 5a to open the communication therebetween.

The connection part 43 connects the shaft part 41 and the valve part 42 to each other as mentioned above, and includes: a conical portion 43a increased in diameter toward the shaft part 41 from the valve part 42; and a columnar portion 43b serving as a base portion formed adjacent to the shaft part 41 so as to be continuous with the conical portion 43a.

It should be noted that an upper portion of the return spring 24 is held at a peripheral face of the columnar portion 43b.

Furthermore, a plurality of reduced thickness portions 45, each having a curved concave shape in cross section as viewed in an axial direction of the valve body 4, are formed across the above-described connection part 43 from the conical portion 43a to the columnar portion 43b.

It should be noted that as illustrated in FIG. 1, the connection part 43 is placed in the valve chest V, and is located at a region positioned inwardly of the return spring 24. In other words, the connection part 43 is placed so as to be surrounded by the return spring 24, and the reduced thickness portions 45 formed in the connection part 43 are also placed so as to be surrounded by the return spring 24.

The reduced thickness portions 45 each have a curved concave shape in a radial direction of the connection part 43 as illustrated in FIGS. 2 and 3A, and each have a continuous groove shape in an axial direction of the connection part 43 as illustrated in FIGS. 2 and 3C. Moreover, the above-described reduced thickness portions 45 are formed at equal intervals (at intervals of 120 degrees) in a circumferential direction of the connection part 43 as illustrated in FIG. 3A, and a total of the three reduced thickness portions 45 are formed in the circumferential direction of the connection part 43 in the present embodiment. Therefore, the volume of the connection part 43 is smaller than that of a connection part having no reduced thickness portions 45 described above by the three reduced thickness portions 45. Thus, occurrence of sink marks caused by deformation due to heat shrinkage at the time of molding will be suppressed, thereby ensuring formation accuracy of the valve body 4 accordingly.

Further, since the connection part 43 is formed to have the three reduced thickness portions 45 described above, an amount of change in an axial cross-sectional area of the conical portion 93a (i.e., an amount of change in an axial thickness thereof) is smaller and more gradual than that of change in the axial cross-sectional area of the conical portion 43a having no reduced thickness portions 45 described above. In other words, the connection part 43 has no region whose axial cross-sectional area sharply changes, and therefore, occurrence of sink marks in the connection part 43 is suppressed also in this respect. Thus, the formation accuracy of the valve body 4 is ensured.

Furthermore, the connection part 43 is formed so that the columnar portion 43b whose thickness does not change is connected to an increased diameter region of the conical portion 43a in which an amount of change in thickness is gradual, and the connection part 43 thus has no region whose thickness is sharply increased, thereby preventing stress concentration when the valve part 42 is seated on the valve seat 5a.

As illustrated in FIG. 3B, a flat surface 46 is formed at a connected region between the valve part 42 and the connection part 43. The flat surface 46 is a plane perpendicular to the axial direction of the connection part 43, and is a surface formed at a region where a left die 61 (see FIG. 4D) for forming the connection part 43 and a valve part molding die 63 (see FIG. 4D) for forming the valve part 42 come into contact with each other at the time of injection molding described later.

Next, exemplary steps of molding the valve body 4 by injection molding will be described with reference to FIGS. 4A to 5C and referring to each diagram as appropriate.

Figure 4A:
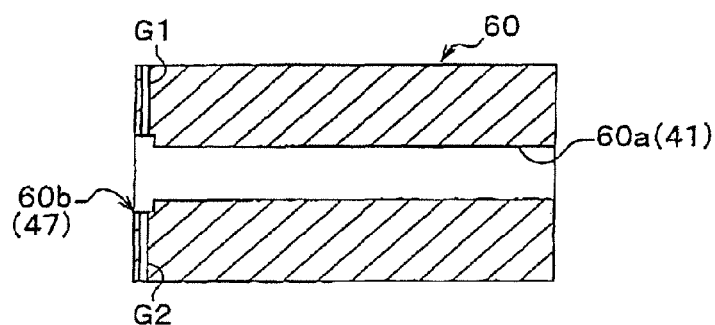
FIGS. 4A to 4C are explanatory diagrams illustrating steps of molding the valve body.

As illustrated in FIG. 4A, a through hole 60a for forming the shaft part 41 of the valve body 4 is formed in the fixed die 60, and an opening edge of the through hole 60a, located at the left side of FIG. 4A, is provided with a concave portion 60b for forming the collar portion 47. In addition, the gates G1 and G2 are formed so as to be communicated with the concave portion 60b.

Figure 4B:
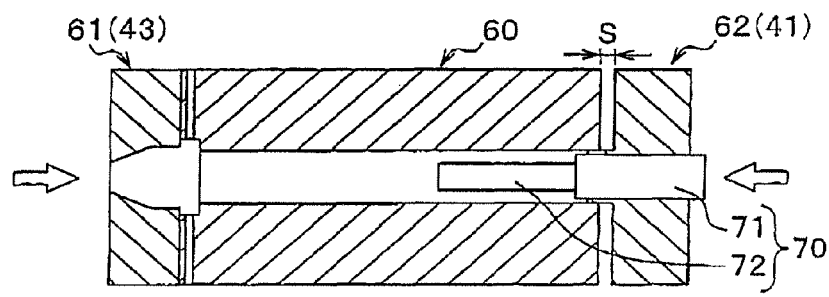

As illustrated in FIG. 4B, at the time of molding, the left die 61 and right die 62 are first combined with the fixed die 60 in a lateral direction of FIG. 4B. The left die 61 is a die for forming the connection part 43, and is combined with the fixed die 60 so as to be abutted against a left end portion thereof. The right die 62 is a die for forming the upper end portion 41b of the shaft part 41, and is combined with a right end portion of the fixed die 60 with a space S provided therebetween in consideration of a pressing amount at the time of compression molding described later.

In this embodiment, the pin 70 functioning as a member for resin compression is integrally attached to a center portion of the right die 62. The pin 70 is inserted into the through hole 60a of the fixed die 60 when the right die 62 is combined therewith, and has: a large diameter portion 71 located at a right end opening of the through hole 60a; and a small diameter portion 72 continuous with the large diameter portion 71 and extended toward a left end of the through hole 60a.

The above-described pin 70 moves toward the fixed die 60 along with a pressed movement of the right die 62 when compression molding is carried out.

Figure 4C:
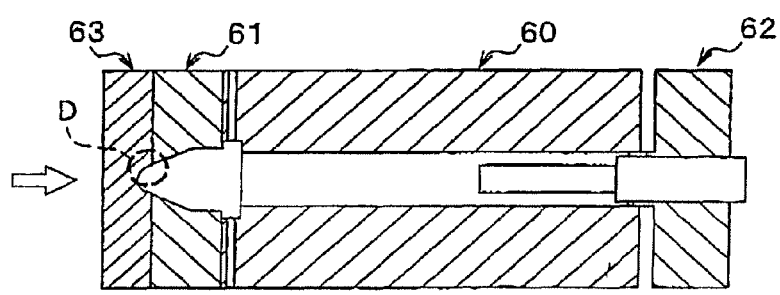

Next, as illustrated in FIG. 4C, the valve part molding die 63 is combined with the left die 61. The valve part molding die 63 is a die for forming the valve part 42, and is combined with the left die 61 so as to be abutted against a left end portion thereof. As described above, in the present embodiment, the valve part molding die 63 is provided in addition to the left die 61 in order to ensure the shape accuracy of the valve part 42.

Figure 4D:
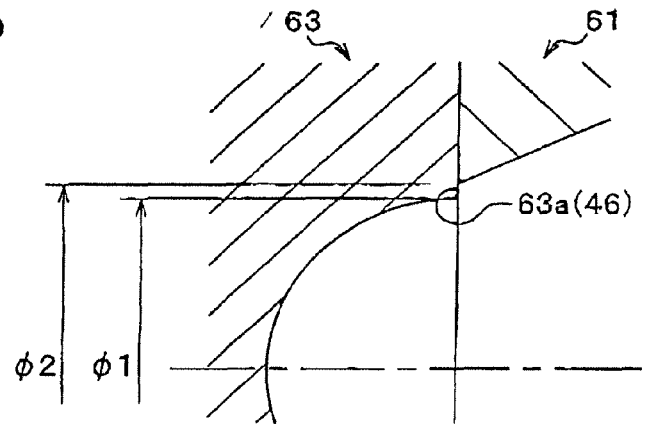
FIG. 4D is an enlarged diagram of a D area of FIG. 4C.

In this embodiment, as illustrated in FIG. 4D, an opening diameter φ1 of the valve part molding die 63 is smaller than a left end opening diameter φ2 of the left die 61, and due to this diameter difference, a step portion 63a for forming the above-mentioned flat surface 46 is formed in a region where the left die 61 and the valve part molding die 63 are combined. By forming the above-described step portion 63a between the left die 61 and the valve part molding die 63, burrs that might be created in a gap between the left die 61 and the valve part molding die 63 can be minimized.

Figure 5A:
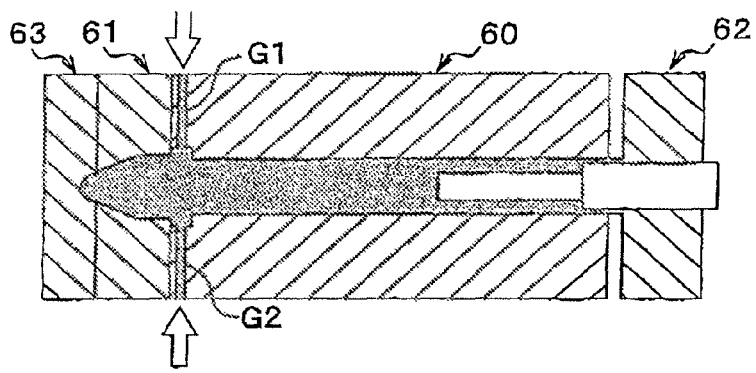
FIGS. 5A and 5B are explanatory diagrams illustrating molding steps.

Then, the dies are clamped together after being combined with each other in the above-described manner, and as illustrated in FIG. 5A, a molten resin is charged into the dies through the gates G1 and G2, thereby filling the inside of the dies with the molten resin to which an injection pressure is applied.

Figure 5B:
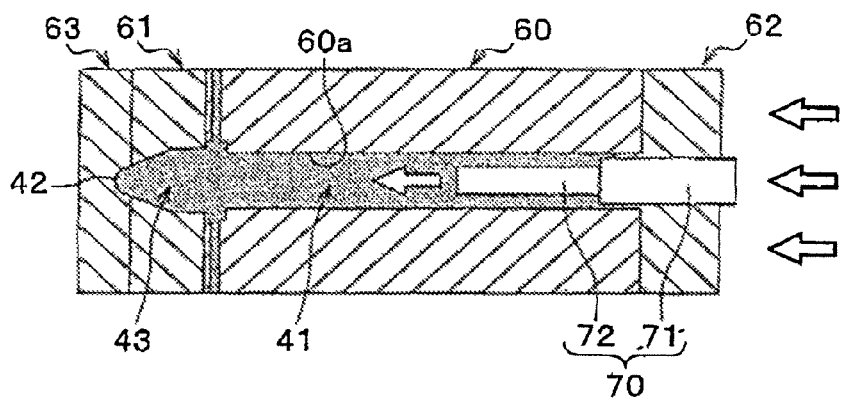

Thereafter, when the resin material is hardened to some extent due to cooling after the charging, the right die 62 is pressed and moved toward the fixed die 60 as illustrated in FIG. 5B. Then, along with the movement of the right die 62, the pin 70 is further advanced through the through hole 60a of the fixed die 60. Thus, a pressure is applied to the charged resin in accordance with the volume of the advanced pin 70, thereby compressing the resin.

It should be noted that the movement of the right die 62 is stopped upon abutment against a right end face of the fixed die 60.

With the pressed movement of the right die 62, the pin 70 will axially advance toward the valve part 42 from the upper end portion 41b of the shaft part 41 opposite to the valve part 42, and since the small diameter portion 72 of the pin 70 is extended toward the valve part 42, a pressure is suitably applied toward the valve part 42 along with the advance of the pin 70, thereby suitably compressing the resin.

Figure 5C:
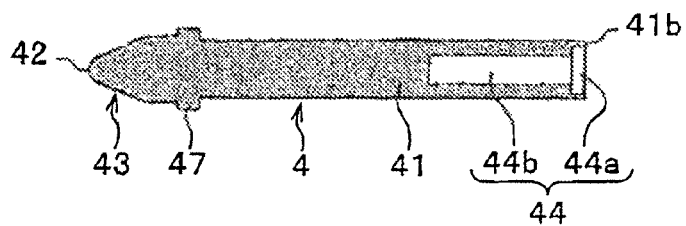
FIG. 5C is a cross-sectional view illustrating the molded valve body.

Thereafter, the resin is removed from the dies upon complete hardening, thus obtaining the valve body 4 resin-molded in one piece as illustrated in FIG. 5C.

It should be noted that the pin 70 does not necessarily have to be used as the member for compression molding, but may be used as a member for forming the hole 44 in the shaft part 91.

In the normally opened solenoid valve 1 according to the present embodiment described thus far, the connection part 43 has the conical portion 43a increased in diameter toward the shaft part 41 from the valve part 42, and the axially concave reduced thickness portions 45 located at equal intervals in the circumferential direction are formed in the conical portion 43a. Therefore, a volume reduction by the reduced thickness portions 45 is enabled while the strength provided by the conical portion 43a is ensured.

Accordingly, the occurrence of sink marks at the time of resin molding can be suitably suppressed, and the shape accuracy of the valve part 42 can be improved.

Further, since a plurality of the reduced thickness portions 45 are located at equal intervals in the circumferential direction of the conical portion 43a, the thickness of the conical portion 43a will not be unbalanced in the circumferential direction thereof. Furthermore, since the reduced thickness portions 45 each have a concave shape in its axial direction, an amount of change in the axial cross-sectional area of the conical portion 43a can be accordingly more gradual as compared with a case where no reduced thickness portions 45 described above are provided.

Thus, the occurrence of sink marks at the time of resin molding can be suitably suppressed, and the shape accuracy of the valve part 42 can be improved.

Furthermore, since the conical portion 43a is formed from the valve part 42 toward the shaft part 41, the valve part 42 will be substantially located at the top of the conical portion 43a, and an abutting force acting on the valve part 42 will be directly transmitted to the conical portion 43a from the valve part 42 at the time of valve closing. Thus, the strength of the valve part 42 can be suitably ensured, and the shape accuracy of the valve part 42 is improved as mentioned above. And in conjunction with these effects, the possibility of occurrence of deformation or the like in the valve part 42 (or the valve body 4) can be reduced. Therefore, opening/closing of the valve body 4, stabilized over a long period of time, can be realized, and the normally opened solenoid valve 1 with high operational reliability is obtained.

Moreover, since the conical portion 43a of the connection part 43 has a conical shape gradually increased in diameter toward the shaft part 41 from the valve part 42, an amount of change in the cross-sectional area of the conical portion 43a from the valve part 42 toward the shaft part 41 can be set to be gradual. Thus, stress concentration on a portion of the connection part 43 will be prevented, and endurance strength of the connection part 43 and the valve part 42 can be increased.

Besides, since the hole 44 is formed in the shaft part 41, the shaft part 41 can be reduced in weight, and the valve body 4 can be eventually reduced in weight.

Further, at the time of molding of the valve body 4, the hole 44 can be formed by inserting the pin 70 into the shaft part 41. In this case, the pin 70 can be utilized as the member for resin compression at the time of molding of the valve body 4.

When the pin 70 is utilized as the member for resin compression, the pin 70 can be axially inserted into the shaft part 41 toward the valve part 42 from the upper end portion 41b located opposite to the valve part 42, and the resin can be compressed by the pin 70. Thus, the shape accuracy of the valve part 42 can be further improved.

Furthermore, in this case, since the pin 70 is axially inserted toward the valve part 42 from the upper end portion 41b of the shaft part 41, the resin can be effectively compressed toward the valve part 42 in a direction in which the pin 70 is inserted, and the occurrence of sink marks can be further effectively prevented.

Moreover, the connection part 43 has the columnar portion 43b provided continuously with the conical portion 43a, and the reduced thickness portions 45 are formed from the conical portion 43a to the columnar portion 43b; therefore, the volume of the valve body in the connection part 43 can be further reduced, and the occurrence of sink marks at the time of resin molding can be further suppressed. Thus, the shape accuracy of the valve part 42 can be further improved.

Besides, the valve body 4 is formed by being molded in one piece using the resin, and therefore, it is possible to form the valve body 4 without degrading workability even when the valve body 4 has a complicated shape provided with a plurality of the reduced thickness portions 45 and the hole 44.

Although one embodiment of the present invention has been described thus far, the present invention is not limited to one embodiment described above, but changes may appropriately be made without departing from the scope of the present invention.

Figure 6A:
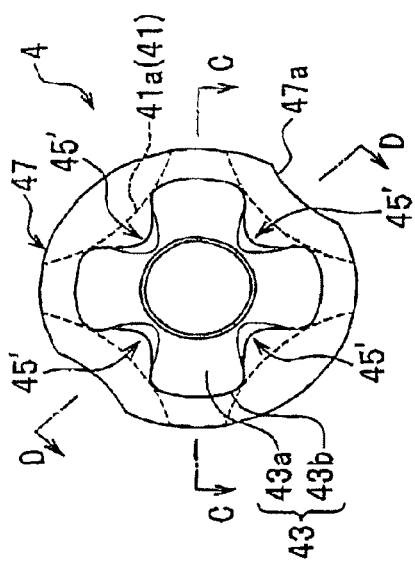
FIG. 6A is a diagram illustrating a valve body according to a variation of the present invention, as viewed from a valve part.
Figure 6C:
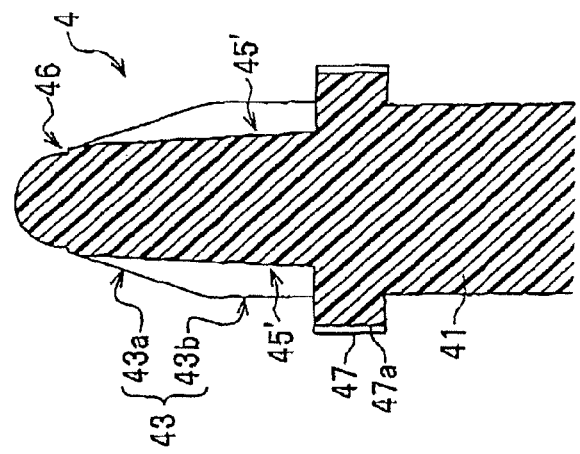
FIG. 6C is a cross-sectional view taken along the line D-D of FIG. 6A.
Figure 6B:
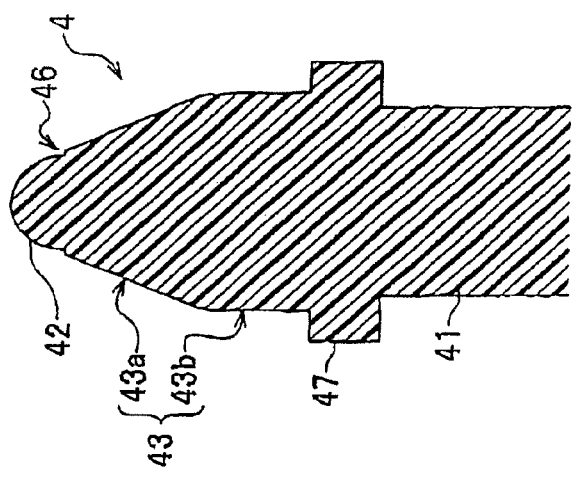
FIG. 6B is a cross-sectional view taken along the line C-C of FIG. 6A.

For example, as illustrated in FIGS. 6A to 6C, a total of four reduced thickness portions 45' may be formed at equal intervals (e.g., at intervals of 90 degrees) in the circumferential direction of the connection part 43. It should be noted that although not illustrated, a total of the two reduced thickness portions 45 may be formed at equal intervals (e.g., at intervals of 180 degrees) in the circumferential direction, or the five or more reduced thickness portions 45 may be formed in an analogous fashion.

Moreover, although an example in which the reduced thickness portions 45 are formed from the conical portion 43a to the columnar portion 43b has been described in the foregoing embodiment, the reduced thickness portions 45 may be formed only in the conical portion 43a, or lengths of the reduced thickness portions 45 formed in the axial direction may be changed so that the reduced thickness portions 45, provided adjacent to each other, have different lengths.

Furthermore, the reduced thickness portions 95 are not limited to the ones having curved concave shapes in cross section, but may take on various cross-sectional shapes.

What is claimed is:

1. A normally opened solenoid valve comprising:
a coil adapted to be energized;
a fixed core adapted to be excited by energization of the coil;
a movable core configured to be moved by being drawn to the fixed core;
a valve seat located at one of openings of a through hole formed in the fixed core; and
a valve body inserted into the through hole and driven by a movement of the movable core, wherein:
the valve body includes:
a shaft part inserted into the through hole and pressed by the movable core;
a valve part seated on or separated from the valve seat; and
a connection part configured to connect the shaft part with the valve part;
the shaft part, the valve part and the connection part are formed in one piece using a resin;
the connection part includes a conical portion increased in diameter toward the shaft part from the valve part;
a plurality of reduced thickness portions, each having a curved concave cross sectional shape as viewed in an axial direction of the valve body, are formed in the conical portion; and
the reduced thickness portions are located at equal intervals in a circumferential direction of the conical portion.

2. The normally opened solenoid valve according to claim 1, wherein:
the shaft part is formed with a hole, the hole being extended from an end portion of the shaft part, located opposite to the valve part, toward the valve part.

3. The normally opened solenoid valve according to claim 1, wherein:
the connection part includes a base portion provided continuously with a region of the conical portion, located closer to the shaft part; and
the reduced thickness portions are formed from the conical portion to the base portion.

4. The normally opened solenoid valve according to claim 1, wherein the shaft part includes grooves.

5. The normally opened solenoid valve according to claim 4, wherein the grooves extend axially along the shaft part, along its periphery.

6. The normally opened solenoid valve according to claim 5, wherein the grooves are curved and concaved in cross section.

7. The normally opened solenoid valve according to claim 5, wherein the grooves are four grooves formed at intervals of 90 degrees in a circumferential direction of the shaft part.

8. The normally opened solenoid valve according to claim 5, wherein the grooves extend to a collar portion at a lower end of the of shaft part, adjacent to the connection part.

9. The normally opened solenoid valve according to claim 1, wherein the shaft part includes a stepped columnar hole.

10. The normally opened solenoid valve according to claim 9, wherein the stepped columnar hole is formed so as to be extended from an upper end portion of the shaft part toward the valve part.

11. The normally opened solenoid valve according to claim 10, wherein the stepped columnar hole includes a large diameter portion near the upper end portion and a small diameter portion extending toward the valve part.

12. The normally opened solenoid valve according to claim 1, further comprising a collar portion at a lower portion of the shaft part.

13. The normally opened solenoid valve according to claim 12, wherein the collar portion has a diameter larger than that of the shaft part.

14. The normally opened solenoid valve according to claim 12, further comprising concave portions formed in the collar portion.

15. The normally opened solenoid valve according to claim 14, wherein at least one of the concave portions is aligned with an axially extending groove formed in the shaft part.

16. The normally opened solenoid valve according to claim 1, wherein the valve part has a hemispherical shape.

17. The normally opened solenoid valve according to claim 1, wherein the connection part comprises:
    a conical portion increased in diameter toward the shaft part from the valve part; and
    a columnar portion serving as a base portion formed adjacent to the shaft part so as to be continuous with the conical portion.

18. The normally opened solenoid valve according to claim 1, further comprising a flat surface formed at a connected region between the valve part and the connection part.

19. The normally opened solenoid valve according to claim 18, wherein the flat surface is a plane perpendicular to the axial direction of the connection part.

\* \* \* \* \*